US009292151B1

(12) United States Patent  
Campiranon et al.

(10) Patent No.: US 9,292,151 B1  
(45) Date of Patent: Mar. 22, 2016

(54) MOBILE COMPUTING DEVICE USER INTERFACE FOR INTERACTIVE ELECTRONIC WORKS

(71) Applicant: INKLING SYSTEMS, INC., San Francisco, CA (US)

(72) Inventors: Chatree Campiranon, Mountain View, CA (US); Peter S. Cho, San Francisco, CA (US); Emily Ann Short, San Francisco, CA (US); Jeffrey Robert Wear, San Francisco, CA (US)

(73) Assignee: Inkling Systems, Inc., San Francisco, CA (US)

( * ) Notice: Subject to any disclaimer, the term of this patent is extended or adjusted under 35 U.S.C. 154(b) by 346 days.

(21) Appl. No.: 13/631,460

(22) Filed: Sep. 28, 2012

(51) Int. Cl.
*G06F 3/048* (2013.01)

(52) U.S. Cl.
CPC ...................................... *G06F 3/048* (2013.01)

(58) Field of Classification Search
CPC ....................................................... G06F 3/048
USPC ......................................................... 715/784
See application file for complete search history.

(56) References Cited

U.S. PATENT DOCUMENTS

| 8,584,035 B2* | 11/2013 | Tseng ................... G06F 1/1624 345/173 |
| 2010/0017732 A1* | 1/2010 | Matsushima et al. ......... 715/765 |
| 2011/0185309 A1* | 7/2011 | Challinor et al. ............. 715/784 |

* cited by examiner

*Primary Examiner* — Andrea Leggett
(74) *Attorney, Agent, or Firm* — Ascenda Law Group, PC

(57) ABSTRACT

A user interface for a mobile computing device includes three distinct display areas, one for presentation of an image and one or more interactive elements, a second for display of a linearly scrollable sequence of content elements, each of which is associated with a corresponding one of the interactive elements, and a third for display of soft keys, each of which corresponds to a respective one of the interactive elements. The soft keys and the interactive elements are responsive to user input so as to cause the image displayed in the first display area to feature prominently a portion thereof corresponding to the interactive element associated with the user input and the content element displayed within the second display area to be that associated with the same interactive element.

19 Claims, 14 Drawing Sheets

MOBILE COMPUTING DEVICE USER INTERFACE FOR INTERACTIVE ELECTRONIC WORKS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Inkling Systems, Inc. All Rights Reserved.

FIELD OF THE INVENTION

The present invention relates to user interfaces for interactive electronic works, and especially such interfaces as are suitable for use in conjunction with mobile computing devices having limited screen areas for display of said works, for example smart phones and similar devices.

BACKGROUND

As the use of mobile computing devices, such as smart phones and the like, for reading electronic works (books, magazines, etc.) becomes more commonplace, there is a growing need to provide consumers with appropriate interfaces for experiencing the rich, interactive content included in these works. Current electronic interfaces often treat rich digital content as though it were traditional print content. While such treatment may be appropriate when the electronic content is a novel or similar work, intended for reading in linear fashion, it is inappropriate for more complex content with which dynamic user interaction is expected. Some interactive works have used specialized reading systems, based on a dedicated hardware platform. However, this approach fails to leverage the increasing market penetration of more generalized, mainstream electronic platforms such as smart phones (e.g., mobile phones employing the iOS™ or Android™ operating systems) and tablet computing systems.

SUMMARY

Disclosed herein, as examples but not limitations of the present invention, are systems, methods and user interfaces for a mobile computing device. The user interface provides for the display of an image and one or more interactive elements in a first portion of a display of the mobile computing device. The interactive elements each highlight designated areas of the image and are responsive to user inputs. The user interface further provides for the display of one or more content elements in a second portion of the display of the mobile computing device. Each of the content elements is associated with a corresponding one of the interactive elements and includes information regarding respective designated areas of the image associated with the respective content element. The user interface further is responsive to user selection of one or more of the content elements to display within the second portion of the display the corresponding one of the content elements.

In further embodiments, interactive digital content may be presented on a display of a mobile computing device such that content displayed in the first area of the display comprises one of a plurality of images, each image associated with one or more interactive elements, the interactive elements highlighting designated areas of the one or more images and being responsive to user inputs, and content displayed in a second area of the display comprises one or more content elements, each of the content elements associated with a corresponding one of the interactive elements and including information regarding items depicted in one of the plurality of images associated with the respective content element; and responsive to either (i) selection of one of the content elements presented in the first area of the display, or (ii) navigation to one of the content elements within the second area of the display, (i) a corresponding one of the content elements within the second area of the display, or (ii) a corresponding one of the images that includes a corresponding one of the content elements within the first area of the display, respectively, is presented.

In some instances, the user interface further provides for the display, within a third area of the display of the mobile computing device, a series of soft keys. Each of the soft keys corresponds to a respective one of the interactive elements highlighting designated areas of the image, and is responsive to user selection. Upon such user selection, a corresponding one of the content elements associated with the respective interactive element of the selected soft key is displayed within the second portion of the display.

The content elements may be arranged in a scrollable fashion corresponding to sequential numbering of the interactive elements. One or more of the content elements may also be scrollable in a direction orthogonal to the scrollable arrangement of the content elements. For example, the content elements may be organized in a linear scrollable arrangement and may be displayed sequentially within the second area of the display of the mobile computing device so as to indicate to a user the presence of others of the content elements in that arrangement. That is, the content elements may be displayed sequentially within the second area of the display of the mobile computing device with at least a portion of a second one of the content elements being presented concurrently with entirety of a first one of the content elements within the second area of the display. At least one dimension of the second area of the display may be dynamically sized according to content to be displayed within one or more of the content elements.

These examples may be combined in any permutation or combination. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

FIGS. 5-12 show various features and views of a guided tour interface suitable for mobile computing devices and having a ribbon display area according to some embodiments of the present invention.

Figure 1:
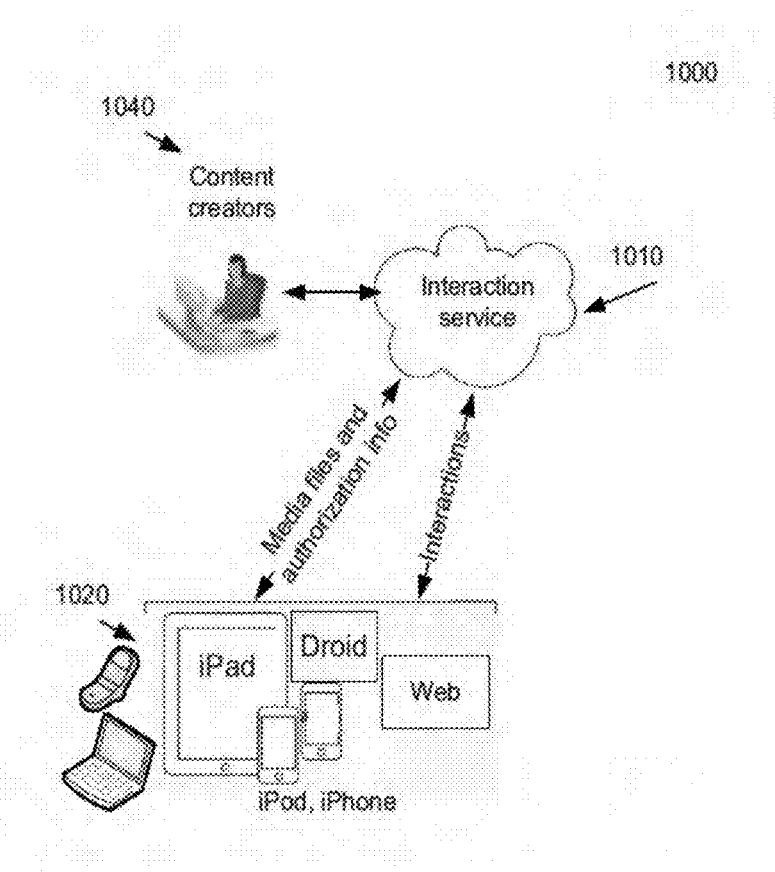
FIG. 1 shows a system that includes an interactive service for providing content to mobile computing devices in accordance with embodiments of the present invention.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Disclosed is a presentation system in the form of a graphical user interface for cross-platform, especially mobile computing device-type platform, interactive electronic works. The interactive electronic works may consist of various digital elements, including one or more interactive content presentation objects, instantiated as a platform-independent digital specification. This platform independent digital specification, along with the various electronic media therein, may be made available to users, who execute the platform independent digital specification in an execution environment on a mobile computing device, for example a smart phone or similar device. The execution environment presents the electronic work, or part of the electronic work, to the user by utilizing appropriate instructions in the platform independent digital specification. The platform independent digital specification instructs the execution environment on the proper placement of the various media objects and the proper responses upon user interactions with those objects. During the presentation of the electronic work, the various pieces of the electronic work allow for various user interactions, as further described herein. In some instances, graphical representations and user interactions therewith will be described with respect to an electronic travel guide. These graphical representations and operations are, however, equally applicable to other types of media including electronic pamphlets, books, magazines, study aids, etc., as well as portions and combinations of such materials.

FIG. 1 shows a system 1000, which includes an interaction service 1010, mobile computing device 1020, and content creators 1040. The interaction service 1010 receives content (e.g., an electronic work) from content creators 1040 and transforms the content to a platform independent digital specification. Examples of electronic works and transformation operations to produce platform independent digital specifications are described in co-pending and commonly owned U.S. patent application Ser. No. 13/019,211, filed 1 Feb. 2011 (the "'211 application"), which is incorporated herein by reference. The platform independent digital specifications may be placed in storage, where users running an execution environment on mobile computing devices 1020 may download or otherwise access the content. The mobile computing devices 1020 present the content to the users, which users may then interact with the content through one or more of the user interfaces described in further detail below.

As discussed in the above-cited '211 application, an electronic work and its constituent presentation objects may be created by content authors using digital content templates. These content templates, or "blueprints", consist of a number of standardized content presentation formats, or shells, which authors use as a basis for producing the various interactive content presentation objects. In some examples, only content presentation objects created with a content blueprint will be valid content recognized by the execution environment. This may be to ensure that the content is properly handled, recognized, and displayed by the various execution environments running on the different types of electronic readers. In some examples, a blueprint may be an extensible markup language ("XML") file, a hypertext markup language ("HTML") file, or the like. Once a blueprint is instantiated, it may be referred to as a "media card."

A table of contents blueprint of an electronic work may represent the organization of the overall work and describe how the rest of the media cards in the work are structured. In some examples, this may take the form of a tree structure with the table of contents card being the root node. In some examples, the other media cards may be organized into chapters and all chapters may be organized into smaller units, and so on. Each chapter may consist of primary cards (generally reading cards that correspond with sections from the main text) and embedded cards (image figures and other reading cards that are linked to from the primary cards). Embedded cards may be included as children of the parent card in the table of contents card. Other linear and non-linear structures may be represented depending on the application.

Figure 2:
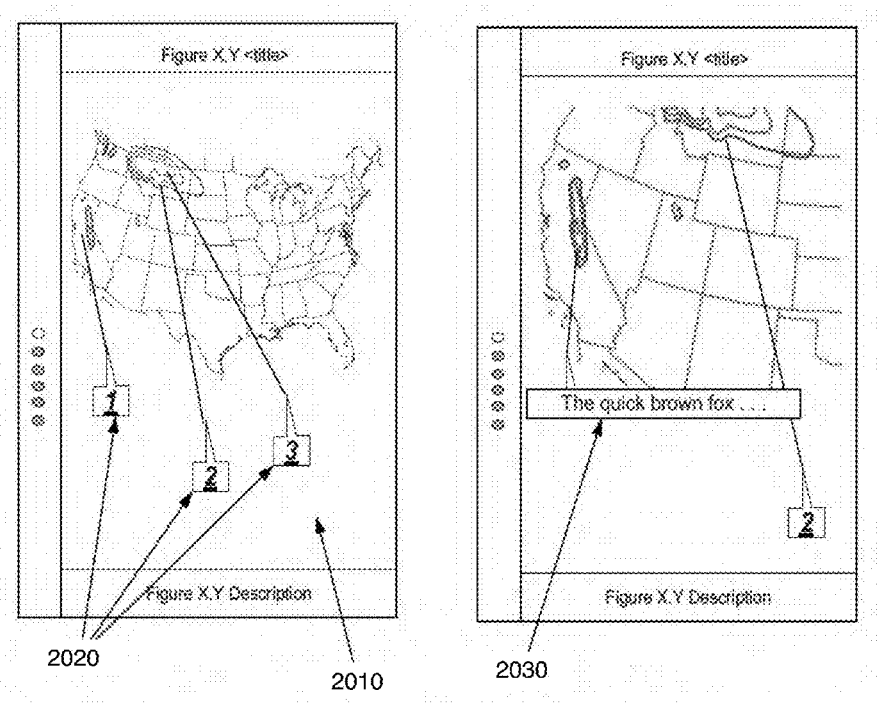
FIG. 2 shows an example of a guided tour user interface according to some embodiments of the present invention.

One example of a blueprint is a guided tour blueprint. This is a convenient way of describing a complex diagram with numerous steps or complicated concepts. This blueprint displays a single large image and steps the user through various points in the image, zooming to a specific region of the image, and automatically displaying associated text as the image is navigated. FIG. 2 illustrates one example of a guided tour. In the illustration on the left, an image 2010 is shown with various steps 2020 (labeled 1-3 in the figure). As shown in the illustration on the right, when a user seeks further information about one of the items highlighted by a step indicator, a poptip 2030 may be provided. As indicated, stepping to step 1 (e.g., by selecting the associated indicator) zooms the image toward step 1 and expands the poptip associated with that step. Advancing or stepping to step 2 would zoom the image toward that step and expand that step's poptip and so on.

The guided tour blueprint may be platform agnostic, however, both the media and the blueprint may be adjusted by the interaction service to adjust for different device characteristics. Thus, for example, even if the images on two different devices are of different sizes, the blueprint may be adjusted for that platform so that the region of interest is always included in what is rendered for the user, and the layout of the text and other elements around and near the image is correct regardless of the shape/size of their display.

While poptips may be suitable for guided tours presented on devices having sufficient screen real estate (i.e., sufficient available area on a display of the associated device), where screen real estate is limited (as is the case, for example, with mobile computing devices) such poptips may obscure the user's view of the image when presented. If the image is a map or similar object (e.g., in the case of a travel guide), this may be quite undesirable. Accordingly, user interfaces configured in accordance with embodiments of the present invention provide a separate "ribbon" display area within which text, images and other elements or objects can be presented. The ribbon display area is discussed in greater detail below, but first we describe other features of a user interface suitable for mobile computing devices.

Figure 3:
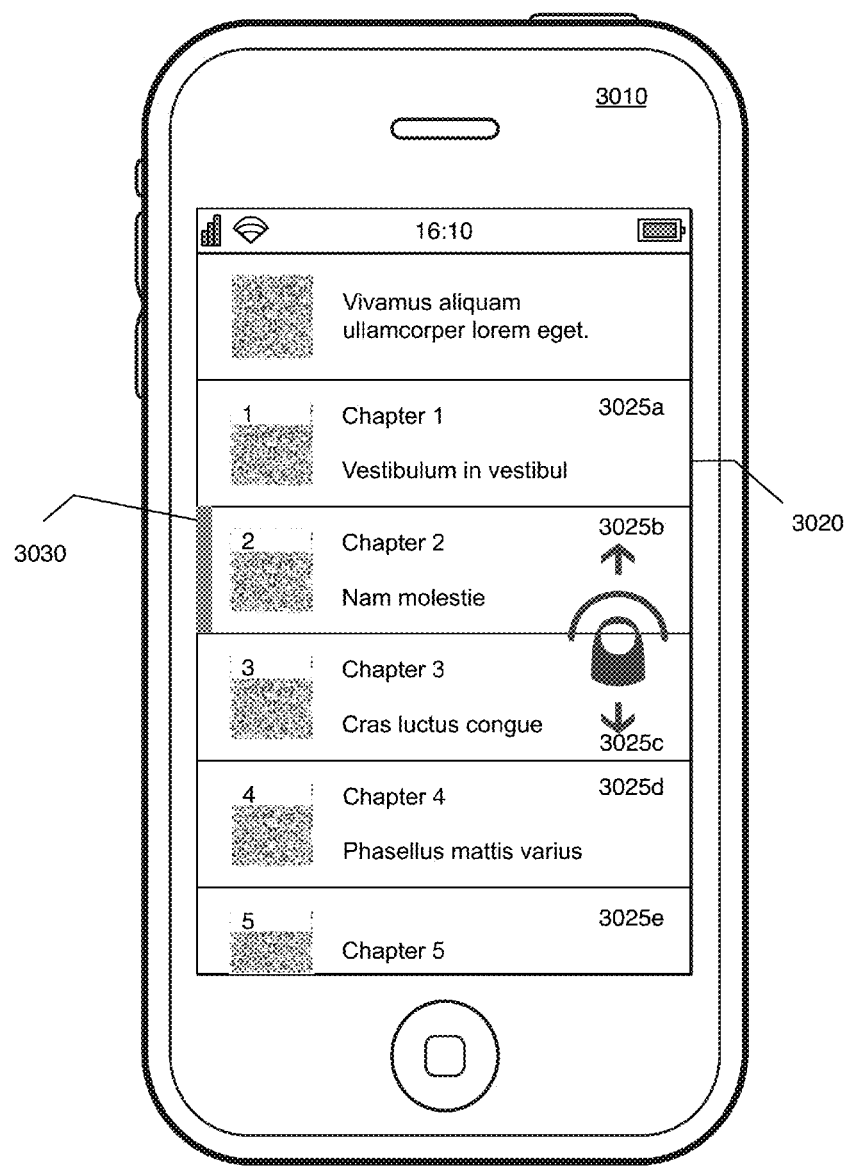
FIG. 3 shows a table of contents user interface for an electronic work according to some embodiments of the present invention.

FIG. 3 illustrates a mobile computing device 3010, within which an electronic work instantiated as a digital specification is being presented. More particularly, the illustration shows a table of contents 3020 for the electronic work. The table of contents is organized into chapters 3025a-3025e, etc., and is bi-directionally scrollable along a longitudinal dimension. A highlight bar 3030 indicates a last-accessed chapter, allowing a user to quickly return to the last chapter that the user was reading when the work was last viewed. In some instances, the location of this highlight bar may be dynamically updated across platforms, so that if a user access a copy of the electronic work on a different device the chapter which the user was last reading on that platform will be synchronized to the copy of the work on mobile computing device 3010 and presented when the user access the copy of the electronic work on this platform. Such synchronization may take place in a peer-to-peer fashion between devices, or, preferably, may occur through a user account associated with interaction service 1010.

Figure 4:
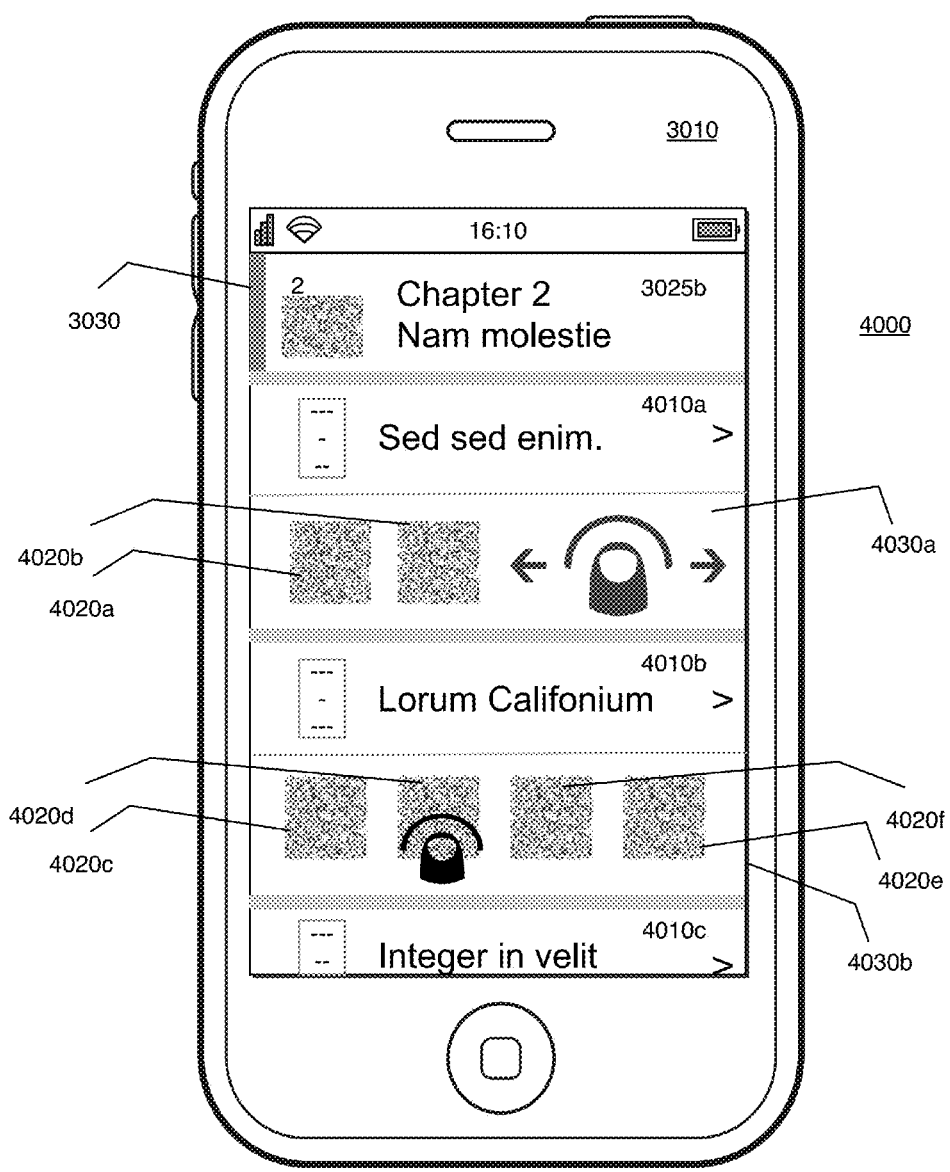
FIG. 4 shows a chapter user interface according to some embodiments of the present invention.

The chapter objects presented in the table of contents are individually selectable, and when selected may open in an accordion fashion, such that content objects within the selected chapter are revealed and other objects below the selected chapter are metaphorically pushed down, out of sight. FIG. 4 illustrates the resulting presentation of a chapter table of contents 4000, with a selected chapter object 3025b and its constituent elements. Each chapter may be made up of a number of sections 4010a-4010c, etc., and each section may include one or more cards. Sections may also include interactive content presentation objects 4020a-4020f, etc., each of which may be separately highlighted within a respective section object tray 4030a-4030b, etc., as shown. Within the trays 4030a-4030b, etc., the content presentation objects of a given section may be bi-directionally scrollable along a transverse dimension.

Figure 5:
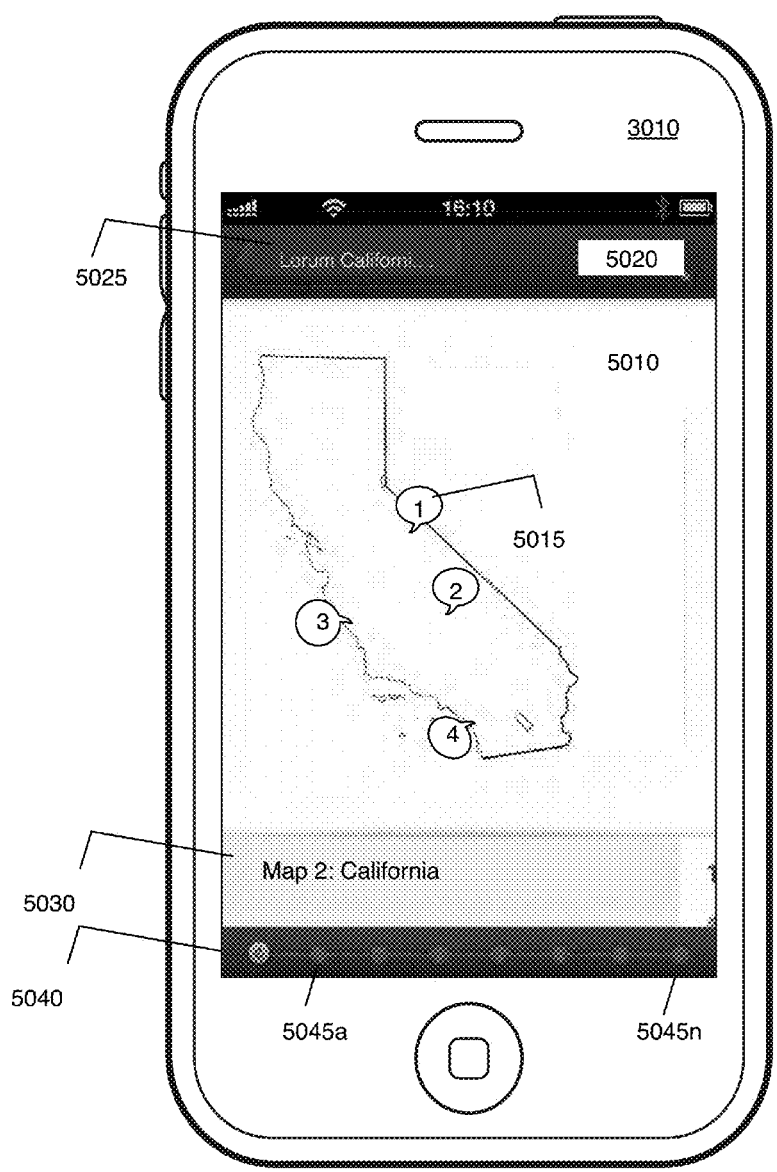

Among the different forms of content presentation objects may be guided tour objects 4020d. Selecting a guided tour object (as shown) causes the guided tour to open, as shown in FIG. 5.

Guided tour 5000 includes, as before, a map or image 5010 of a particular region, point of interest, item, museum or other building, etc. Guided tours may be fashioned for any place, item or other construct that would benefit from being explained in a series of individually discussed steps. For example, walking tours of a city (or portion thereof) can be crafted as guided tours. So too can instructions for completing a task or recipe, descriptions of complex diagrams, and even navigating a collection of vacation photos. In short, although the guided tours described herein relate to geography, the guided tour object is not limited to use in connection with such items and can instead be employed in connection with all manner of things.

As before, the image 5010 is annotated with a series of interactive points of interest (POI) 5015 (labeled 1-4 in this example). The POIs are associated with items of interest in the map or image 5010 and may be represented using any convenient object, such as the callouts used in the present illustration or other elements. The guided tour 5000 may also include a navigation bar 5020, with a "Back" button 5025, allowing the user to navigate back to the previous screen (e.g., the chapter table of contents 4000 shown in FIG. 4). Navigation within the electronic work may thus be handled in a hierarchical fashion, allowing the user to move forwards and backwards through a tree-like structure of the cards, content presentation objects and other media comprising the electronic work. In other embodiments, different organizational paradigms may be employed, allowing for different navigation paths through the work.

Ribbon display area 5030 is shown at the bottom of the map or image 5010 and includes content describing what is shown in the map/image. The ribbon display area 5030 may be dynamically sized to accommodate the content to be displayed. Ideally, ribbon display area will have a designated maximum height and width (although in some instances the width may be fixed and only the height of the ribbon display area will be variable), so that even at its largest size the ribbon display area occupies only a designated portion of the total available screen area of device 3010. For example, in various embodiments the ribbon display area 5030 may be configured to occupy no more than one-half of the available screen real estate, no more than one-third of the available screen real estate, no more than one-fourth of the available screen real estate, no more than one-fifth of the available screen real estate, or no more than some other fraction of the available screen real estate. In other instances, both the ribbon display area 5030 and the map/image 5010 may be dynamically sizable and may each be scaled appropriately to accommodate content within each portion of the overall display area of device 5020 so as to maintain an enjoyable user experience when viewing the various content of the guided tour.

At the very bottom of the overall display area is a SLIDE-LINE™ interface 5040, which is a form of user navigation interface that allows the user to navigate between a series of images (or other media objects) that relate to each other. The images may be maps or other images of the guided tour (such as map 5010) and the different soft keys 5045a-5045n within the SLIDELINE interface may be coordinated with the POIs 5015 represented in the maps/images such that selection of either a POI or its associated soft key causes the guided tour to advance to an image and content object in the ribbon display area associated with that POI/soft key. Each image in the guided tour is represented on the SLIDELINE interface as a soft key, and the currently displayed image may be represented as a highlighted soft key (see, e.g., FIG. 8, showing a highlighted soft key associated with an image representing POI 3).

Figure 6:
Figure 7:
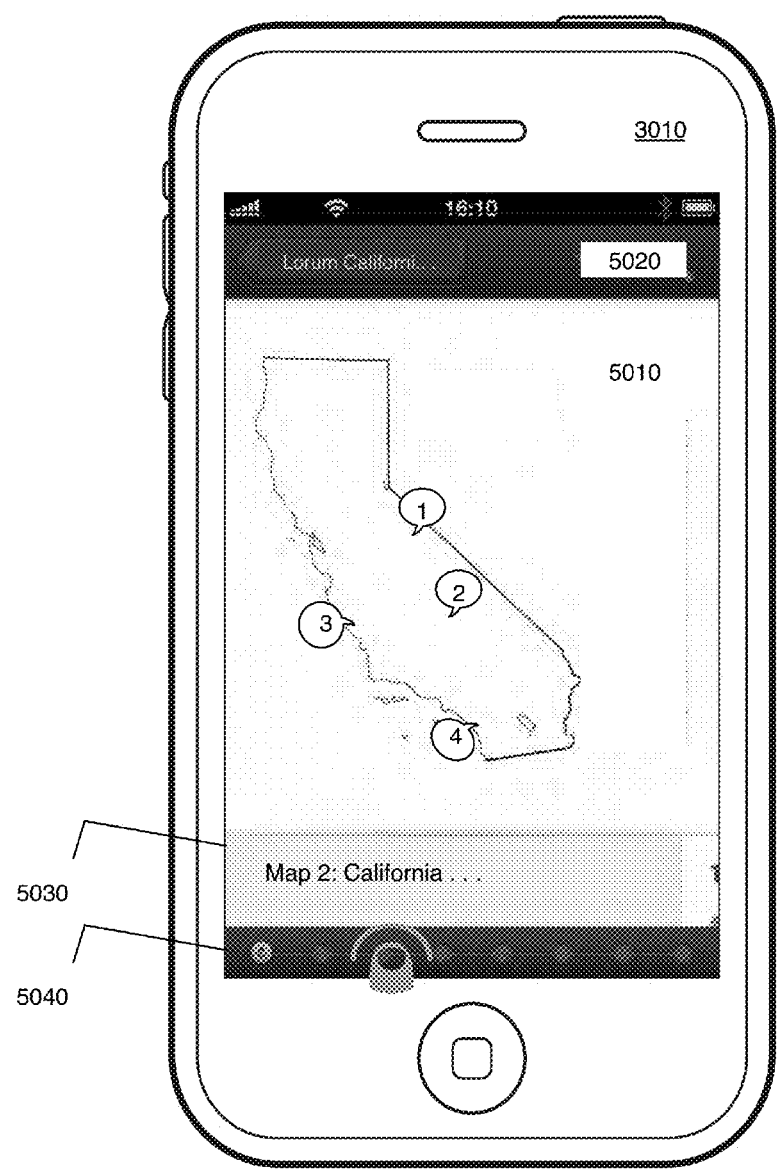

Above it was mentioned that the POIs 5015 and soft keys 5045 are correlated with one another and that either may be used to advance through the guided tour. FIG. 6 illustrates the selection of a POI (in this case POI 3) as a means of navigating to an object of the guided tour associated with this POI. FIG. 7 illustrates an alternative means of navigating to the same object, but this time using a soft key in SLIDELINE interface 5040.

Figure 8:
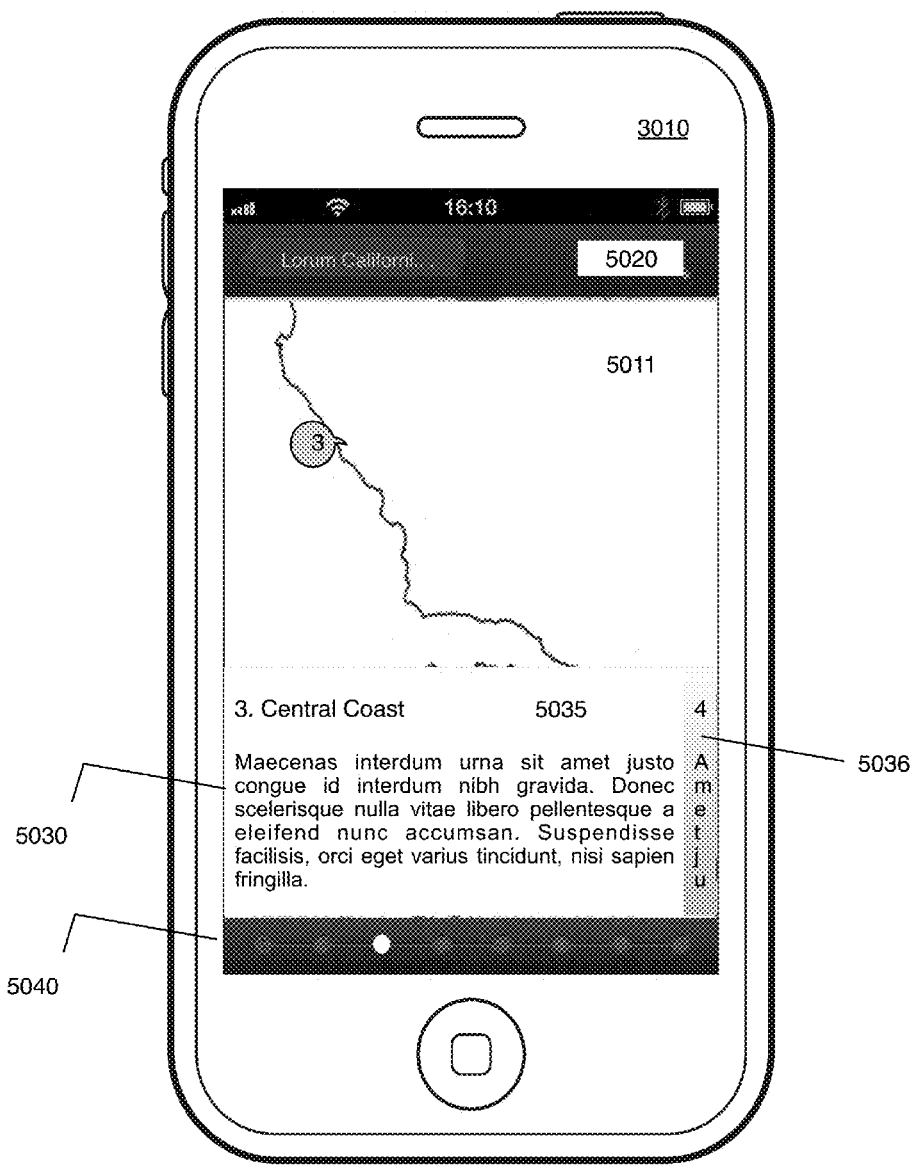

FIG. 8 illustrates the resulting view of POI 3 and its associated map/image 5011 and content 5035 in ribbon display area 5030. Navigation to this POI view may have been through either mechanism described above (e.g., selection of POI 3 or the corresponding soft key), or through scrolling of the content within the ribbon display area 5030. As shown in the sequence of images in FIGS. 8, 9, 10 and 11, content within the ribbon display area 5030 is scrollable in both the vertical (FIG. 9) and horizontal (FIG. 10) directions. At a certain point in horizontal scrolling (or panning, also known as swiping), the content displayed in ribbon display area 5030 will completely change to that associated with the next POI in sequence (see FIG. 11). In this case, that is content 5036 associated with POI 4. The image or map presented in the remainder of the display area will likewise switch to the image/map associated with POI 4, and the soft key in SLIDE-LINE interface 5040 associated with that POI will become highlighted.

Returning to FIG. 8, when a POI or soft key is selected, or when scrolling through content has resulted in content 5035 being displayed in the ribbon display area, that content will be presented in such a way as to hint at the availability of additional content associated with the next POI. For example, in this instance content item 5035 is formatted so as not to occupy the entirety of the ribbon display area. Instead, a sliver of the next content item, 5036, is visible at the right-hand edge of the content display area. This acts as a signal to the user that further content is available and that it can be obtained using a right-to-left scroll or swipe gesture.

This form of "content tease" (e.g., a format in which the content elements are displayed sequentially within the ribbon area of the display of the mobile computing device with at least a portion of a second one of the content elements being presented concurrently with an entirety of a first one of the content elements) is not limited to scrolling in a single direction. For example, similar content teases could be used in connection with either or both scrolling axes and at either or both ends of a currently displayed content item. Thus, up to four content teases could be presented in situations where scrolling along two orthogonal axes is permitted. In practice, however, it may be preferred to limit the content teases to those that are positioned along a currently traversed scrolling axis, and in a direction of as-yet-unseen content. This will help to preserve screen real estate for the currently viewed content and will signal the availability of additional content along the axis of travel. In other embodiments, as-yet-unseen content may also be displayed along an orthogonal or other scrolling axis, again to act as a signal to the user of the availability of additional materials. The amount of information revealed in a content tease may be static across all content teases (e.g., a commonly sized sliver of information), or may vary depending on the scrolling axis, the amount of available screen real estate, the velocity of travel of the user across a scrolling axis, the relative importance of content (e.g., more may be shown where it serves as the introduction to a new chapter, section, topic, etc.), or other factor. Further, the content tease may be highlighted, shaded or displayed in some other fashion different than the main content displayed for the user, so as to signal its distinctiveness or difference from that main content.

Figure 9:
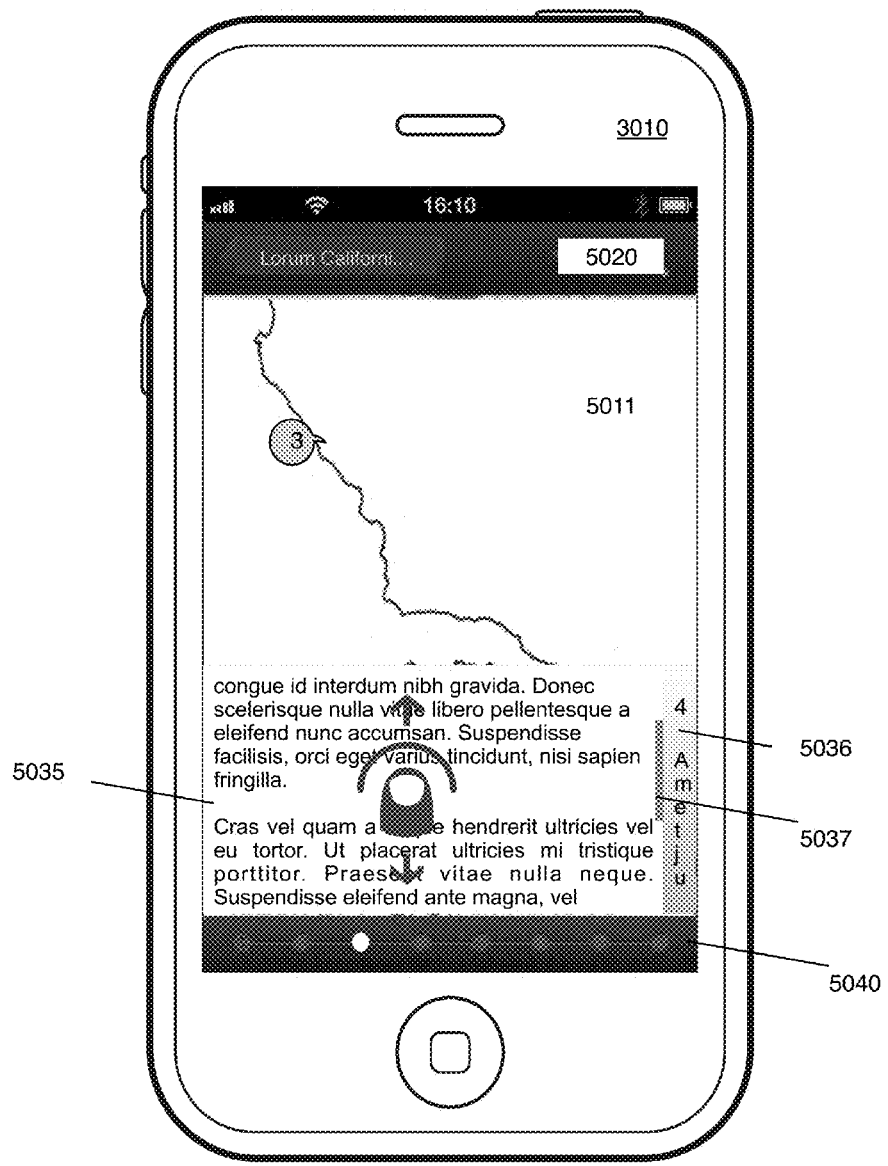

As shown in FIG. 9, when content items presented in the content display area include more text than fits within the available screen space reserved for the content display area, scrolling in the vertical direction can be used to reveal the further content. In such instances, a scroll bar 5037 may appear in the margin of the content item to act as a signal to the user indicating the relative amount of remaining text to be read. In the illustrated example, the scroll bar is shown in the right had margin, but scroll bars in the left hand margin could be used in lieu of or in addition to the right had margin scroll bar.

Figure 10:
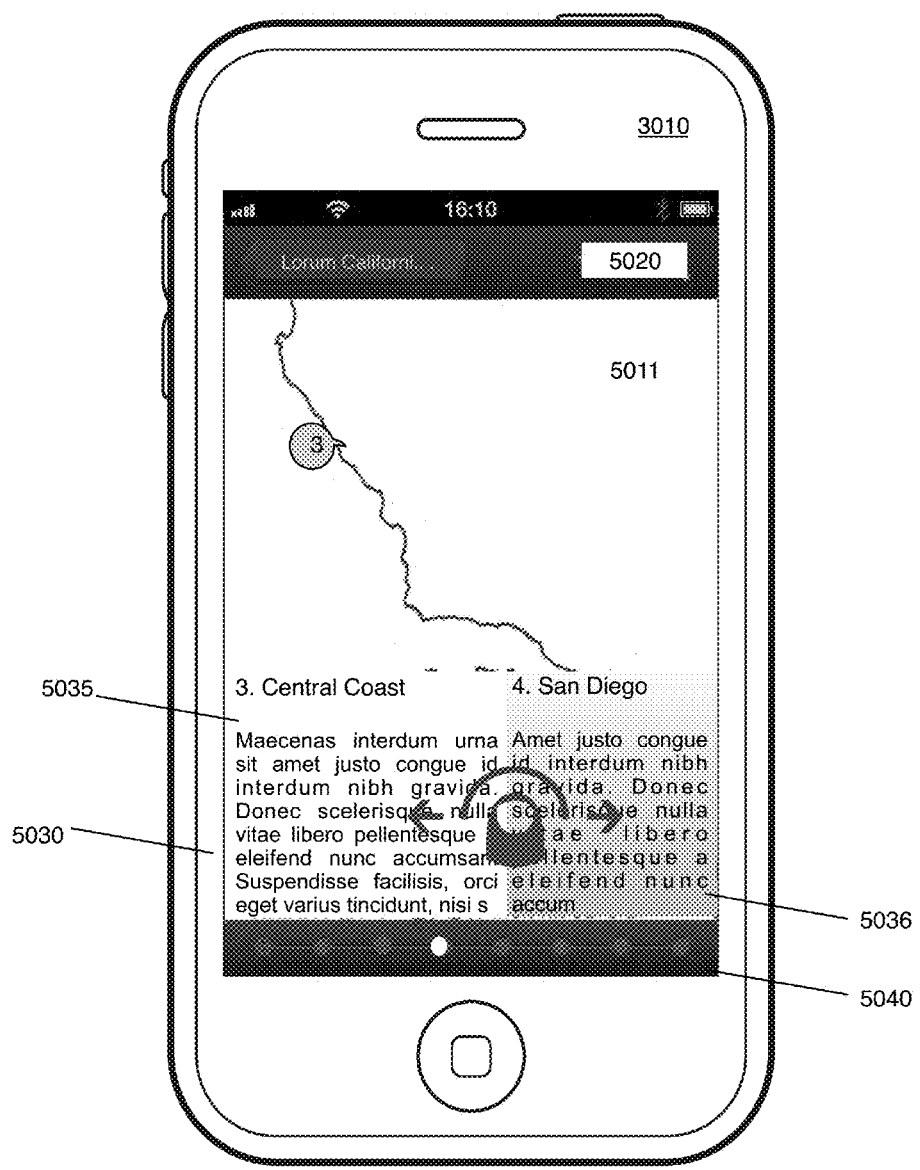

As shown in FIG. 10, scrolling horizontally within the ribbon display area 5030 results in the next content item, 5036, being dragged into the viewable portion of the display. At a certain point in this operation (which may be when content item 5036 is halfway across the display area, more than halfway across the display area or has entirely displaced content item 5035 from the display area), the corresponding image/map will switch to that associated with the new content item. Notice that until the switch occurs, the new content item, 5036, may be rendered in a different color or highlight from the existing content item, 5035, so as to further alert the user that a context switch (to a new POI and map/image) is about to occur as a result of the horizontal scrolling action.

Figure 11:
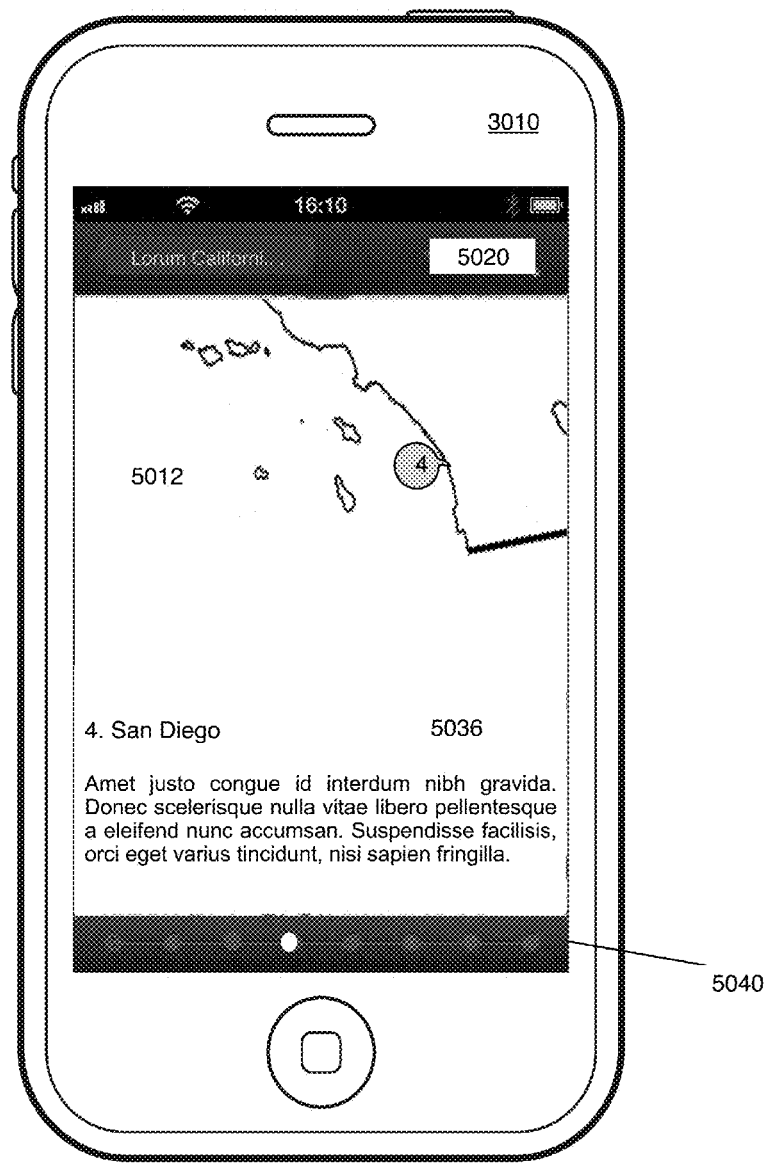
Figure 1:
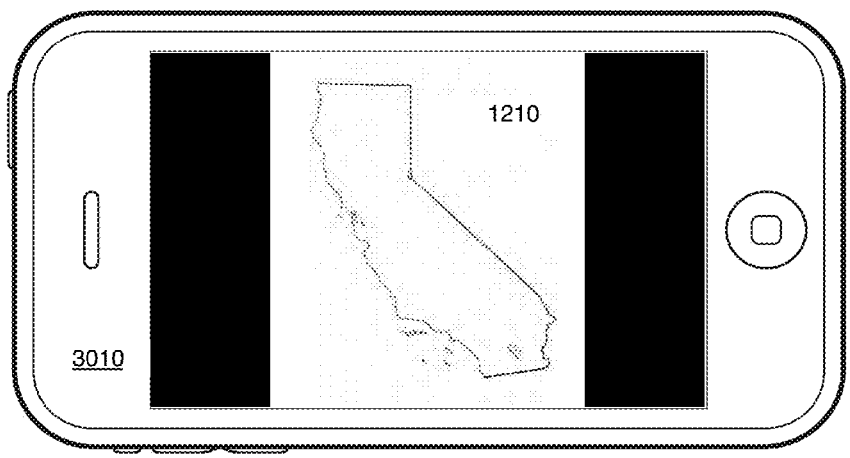

As shown in FIG. 11, when the last content item in the sequence of content items (e.g., that one associated with the last of the POIs in the guided tour) is presented within the content display area, no other portion of any content item is displayed. This signals the user that he/she has reached the last entry in the guided tour. Further scrolling from right to left may result in the guided tour "rebounding" to the beginning, with the result that the first POI, its associated map/image and content item being displayed.

Turing to FIG. 12, in some embodiments rotating the mobile computing device 3010 by ninety degrees (from a portrait orientation to a landscape orientation) may result in replacing the guided tour interface with a static image. In this case, image 1210 depicts the entire area within which the elements of the guided tour take place, however, in other instances different images may be used. For example, images of the then-currently viewed portion of the guided tour may be used. Alternatively, a dynamic interface that allows for selection of "additional features" or further information, etc., may be provided. The use of a static image over a dynamic presentation such as that described above may be preferred because of the limited screen area available in landscape mode as compared to that available in portrait mode. However, in some instances, the dynamic interface may be used in landscape mode (e.g., in response to a user-specified preference for same).

Thus, the present user interface permits the use of the guided tour metaphor even in a mobile computing device having limited screen real estate. As a user advances from POI to POI (whether by selecting individual POIs, using soft keys of the SLIDELINE interface or by scrolling among content elements), content items displayed in the ribbon display area provide information about the then-currently-displayed POI image/map. These content items are themselves dynamic objects, and can be sized appropriately (in some cases, up to a maximum size) for the amount of text or other content contained therein. The content items can be navigated by scrolling in the vertical direction, and inter-content item navigation can take place by scrolling in the horizontal direction. In other examples different navigation actions may be available for viewing the content items.

Execution Environment and Electronic Reader

The execution environment takes the platform independent digital specification and presents it to the user in a way that allows for user interactions. As used herein, the term "present" includes at least the displaying or playing of audio, visual, and audio-visual content. The content includes text, graphics, images, video, sounds as well as the manipulation of and interaction with that content by an end user.

Figure 13:
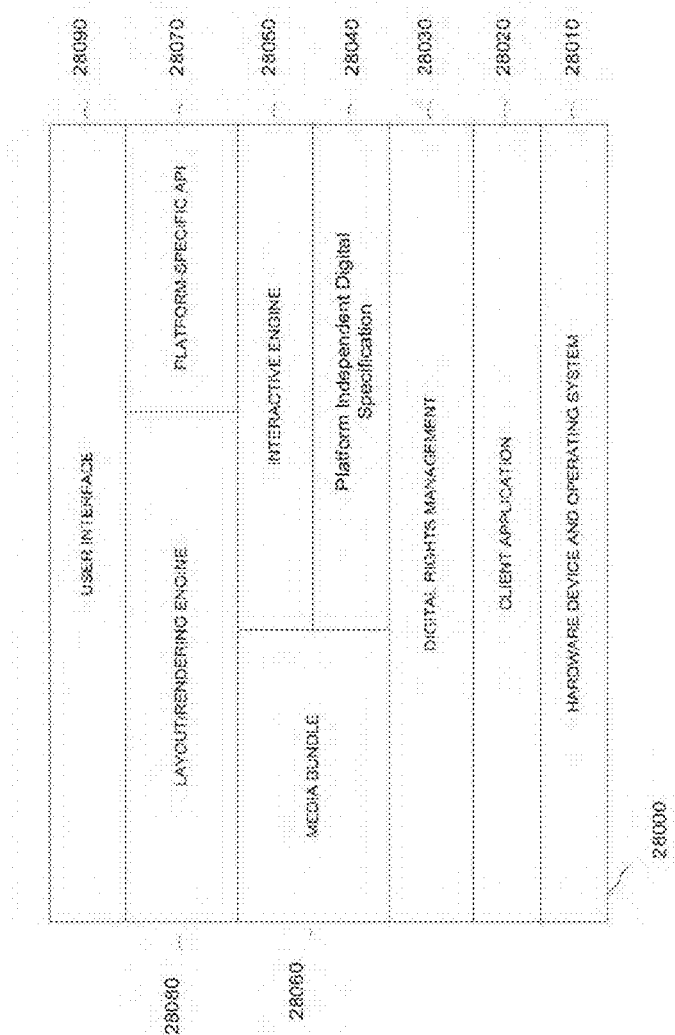
FIGS. 13-14 illustrate portions of a mobile computing device platform suitable for use in connection with some embodiments of the present invention.

FIG. 13 shows some examples system 28000 for an execution environment. In the illustration, hardware device and operating system 28010 is shown. Hardware device and operating system 28010 will likely be dependent on the particular type of mobile computing device. The hardware and operating system layer provide the functions required to run application software, including the processor, system memory, storage, network interface, TCP/IP stack or other protocol stack, and application programming interfaces for the development of software applications. The hardware device and operating system may be of any variation including traditional PC-based operating systems, mobile device operating systems or network-based operating systems that abstract the hardware layer from the application programming interface. Some examples include Microsoft Windows™, UNIX, LINUX, iOS™, MacOS™, ANDROID™, and the like.

Client application 28020 represents the user-level executable the user launches on the client device in order to access the electronic work. In some embodiments, all functions shown in FIG. 13 may be inside the client application. In other examples, only selected portions are encapsulated in client application 28020.

In some examples, digital rights management process 28030 or "DRM" process authorizes and authenticates a particular user or device in order to allow the user to access appropriate media from the electronic work. DRM may authorize an entire book, or selected portions thereof. DRM also prevents the user and device from accessing electronic works or segments thereof that the user is not authorized to access. In some examples, DRM may also be configured to prevent a user or system from extracting text, images, video or other protected assets, and transmitting those assets to another device or writing them out to disk for later retrieval or sharing.

Platform independent digital specification 28040 provides a platform-agnostic representation of all content and metadata for that content. Metadata may include basic information such as the date content was created, the version number, and where the content should appear in the context of its bundle. Metadata may also include descriptions of interactive behavior, such as, for example, where audio annotations would be anchored on an image when it rendered in the system, or how an image might be positioned initially on the screen when a user opens it.

Interactive engine 28050 is configured to interpret the intermediate platform independent digital specification and read data from the media bundle 28060, providing it in a platform-specific representation to the layout/rendering engine 28080 and the platform specific API 28070. The interactive engine may be configured to also handle events such as multi-finger touch inputs to determine the appropriate behavior of the object on screen. Platform specific API 28070 is configured to accept data from the interactive engine 28050 and media bundle 28060 and determine the appropriate objects to instantiate in order to display the content to the user. The layout/rendering engine 28080 works in parallel with the platform specific API 28070 to render that content to the display. The user interface 28090 is a collection of canonical visual elements that provide the user with known results to input behaviors.

The execution environment runs on mobile computing device. In some examples, the electronic reader may be an iPhone™ provided by APPLE INC. of Cupertino Calif., or a tablet computer or electronic reader such as a Nook™, provided by BARNES AND NOBLE INC. of New York, N.Y. or Kindle™ provided by AMAZON.COM of Seattle Wash. In some other examples, the mobile computing device may be a laptop computer. In general the mobile computing device may be any device with a display, an input mechanism, a processor, and electronic storage.

Figure 14:
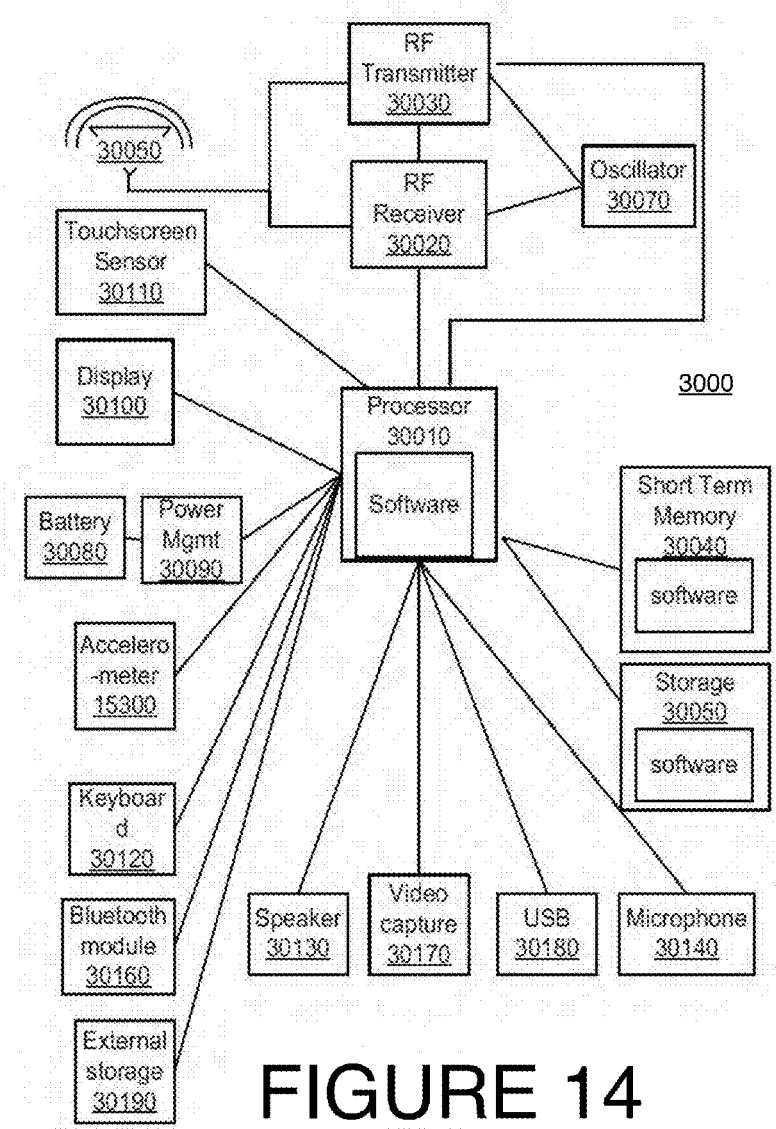

FIG. 14 shows some examples of a mobile computing device 30000. Processor 30010 controls the overall functions of the tablet such as running applications and controlling peripherals. Processor 30010 may be any type of processor including RISC, CISC, VLIW, MISC, OISC, and the like. Processor 30010 may include a Digital Signal Processor ("DSP"). Processor 30010 may communicate with RF receiver 30020 and RF transmitter 30030 to transmit and receive wireless signals such as cellular, Bluetooth, and WiFi signals. Processor 30010 may use short term memory 30040 to store operating instructions and help in the execution of the operating instructions such as the temporary storage of calculations and the like. Processor 30010 may also use non-transitory storage 30050 to read instructions, files, and other data that requires long term, non-volatile storage.

RF Receiver 30020 and RF Transmitter 30030 may send signals to the antenna 30050 of display 30060. RF transmitter 30030 contains all the necessary functionality for transmitting radio frequency signals via. antenna 30050 given a baseband signal sent from Processor 30010. RF transmitter may contain an amplifier to amplify signals before supplying the signal to integrated antenna 30050. RF transmitter 30030 and RF Receiver 30020 are capable of transmitting and receiving radio frequency signals of any frequency including, microwave frequency bands (0.3 to 300 GHz) which include cellular telecommunications, WLAN and WWAN frequencies. Oscillator 30070 may provide a frequency pulse to both RF Receiver 30030 and RF Transmitter 30020.

Device 30000 may include a battery or other power source 30080 with associated power management process or module 30090. Power management module 30090 distributes power from the battery 30080 to the other various components. Power management module 30090 may also convert the power from battery 30080 to match the needs of the various components. Power may also be derived from alternating or direct current supplied from a power network.

Processor 30010 may communicate and control other peripherals, such as LCD display 30100 with associated touch screen sensor 30110. Processor 30010 causes images to be displayed on LCD display 30100 and receives input from the touch screen sensor 30110 when a user presses on the touch-screen display. In some examples touch screen sensor 30110 may be a multi-touch sensor capable of distinguishing, and processing gestures.

Processor 30010 may receive input from a physical keyboard 30120. Processor 30010 may produce audio output, and other alerts which are played on the speaker 30130. Speaker 30130 may also be used to play voices (in the case of a voice phone call) that have been received from RF receiver 30020 and been decoded by Processor 30010. Microphone 30140 is used to transmit a voice for a voice call conversation to Processor 30010 for subsequent encoding and transmission using RF Transmitter 30030. Microphone 30140 may also be used as an input device for commands using voice processing software. Accelerometer 30300 provides input on the motion of the device 30000 to processor 30010. Accelerometer 30300 may be used in motion sensitive applications. Bluetooth module 30160 may be used to communicate with Bluetooth enabled external devices. Video capture device 30170 may be a still or moving picture image capture device or both. Video Capture device 30170 is controlled by Processor 30010 and may take and store photos, videos, and may be used in conjunction with microphone 30140 to capture audio along with video. USB port 30180 enables external connections to other devices supporting the USB standard and charging capabilities. USB port 30180 may include all the functionality to connect to, and establish a connection with an external device over USB. External storage module 30190 may include any form of removable physical storage media such as a flash drive, micro SD card, SD card, Memory Stick and the like. External storage module 30190 may include all the functionality needed to interface with these media.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like. Thus, user interfaces for interactive electronic works, and especially such interfaces as are suitable for use in conjunction with mobile computing devices having limited screen areas for display of said works, for example smart phones and similar devices, have been described.

What is claimed is:

1. A method of presenting interactive digital content on a display of a mobile computing device, in which method content displayed in the first area of the display comprises one of a plurality of images, each image associated with one or more interactive elements, the interactive elements highlighting designated areas of the one or more images and being responsive to user inputs, and content displayed in a second area of the display comprises one or more content elements, each of the content elements associated with a corresponding one of the interactive elements and including information regarding items depicted in one of the plurality of images associated with the respective content element, wherein the content elements are organized in a linear scrollable arrangement and are displayed sequentially within the second area of the display of the mobile computing device, the method comprising:

responsive to navigation to one of the content elements by scrolling to a content element within the second area of the display;

presenting (i) a corresponding one of the content elements within the second area of the display, and (ii) a corresponding one of the images that includes a corresponding one of the interactive elements within the first area of the display, respectively.

2. The method of claim 1, further comprising displaying within a third area of the display of the mobile computing device a series of soft keys, each of the soft keys corresponding to a respective one of the interactive elements, and responsive to user selection of one of the soft keys, displaying within the second area of the display the corresponding one of the content elements associated with the respective interactive element of the selected soft key.

3. The method of claim 1, wherein the content elements are arranged in a scrollable fashion corresponding to sequential numbering of the interactive elements.

4. The method of claim 3, wherein at least one of the content elements is scrollable in a direction orthogonal to the scrollable arrangement of the content elements.

5. The method of claim 1, wherein at least one dimension of the second area of the display is dynamically sized according to content to be displayed within one or more of the content elements.

6. The method of claim 5, wherein the content elements are displayed sequentially within the second area of the display of the mobile computing device with at least a portion of a second one of the content elements being presented concurrently with entirety of a first one of the content elements within the second area of the display.

7. The method of claim 6, further comprising displaying within a third area of the display of the mobile computing device a series of soft keys, each of the soft keys corresponding to a respective one of the interactive elements highlighting designated areas of the image, and responsive to user selection of one of the soft keys, displaying within the second portion of the display the corresponding one of the content elements associated with the respective interactive element of the selected soft key.

8. A mobile computing device comprising a display and a processor configured to present a user interface on the display, the user interface comprising:

a first display area configured to display an interactive image, interactivity being provided via one or more interactive elements displayed with the image so as to highlight one or more items included in the image;

a second display area configured to display a linearly scrollable sequence of content elements, each of the content elements being associated with a corresponding one of the interactive elements and including information regarding a respective item included in the image that is associated with the respective content element, wherein the content elements are organized in a linear scrollable arrangement and are displayed sequentially within the second area of the display of the mobile computing device and navigation to one of the content elements is requested by scrolling to a content element within the second area of the display, and a third display area configured to display a series of soft keys, each of the soft keys corresponding to a respective one of the interactive elements highlighting an item of the image, wherein the soft keys and the interactive elements are responsive to user input so as to cause the image displayed in the first display area to feature prominently the portion of the image corresponding to the interactive element associated with the user input and the content element displayed within the second display area to be that one of the content elements associated with the interactive element associated with the user input.

9. The user interface of claim 8, wherein the content elements are arranged in a scrollable fashion corresponding to sequential numbering of the interactive elements.

10. The user interface of claim 9, wherein at least one of the content elements is scrollable in a direction orthogonal to the scrollable arrangement of the content elements.

11. The user interface of claim 8, wherein the content elements displayed within the second display area in a fashion that alerts a user to the presence of others of the content elements in the linear scrollable sequence.

12. The user interface of claim 8, wherein at least one dimension of the second display area is dynamically sized according to content to be displayed within one or more of the content elements.

13. The user interface of claim 8, wherein the content elements are organized sequentially according to a common sequence with the interactive elements.

14. A processor-based mobile computing device comprising a display, a processor and a computer readable storage medium, the computer readable storage medium having stored thereof computer readable instructions, which instructions when executed by the processor, cause the processor to:

present, in a first portion of a display of the mobile computing device, an image and one or more interactive elements, the interactive elements highlighting designated areas of the image and being responsive to user inputs;

present, in a second portion of the display of the mobile computing device, one or more content elements, each of the content elements associated with a corresponding one of the interactive elements and including information regarding respective designated areas of the image associated with the respective content element wherein the content elements are organized in a linear scrollable arrangement and are displayed sequentially within the second area of the display of the mobile computing device; and present, responsive to user navigation to one of the content elements by scrolling to a content element within the second area of the display, the corresponding one of the content elements.

15. The mobile computing device of claim 14, wherein the computer readable instructions further comprise instructions, which when executed by the processor, cause the processor to present within a third area of the display of the mobile computing device a series of soft keys, each of the soft keys corresponding to a respective one of the interactive elements highlighting designated areas of the image, and responsive to user selection of one of the soft keys, present within the second portion of the display the corresponding one of the content elements associated with the respective interactive element of the selected soft key.

16. The mobile computing device of claim 14, wherein the computer readable instructions further comprise instructions, which when executed by the processor, cause the processor to present the content elements arranged in a scrollable fashion corresponding to sequential numbering of the interactive elements.

17. The mobile computing device of claim 16, wherein at least one of the content elements is scrollable in a direction orthogonal to the scrollable arrangement of the content elements.

18. The mobile computing device of claim 14, wherein the computer readable instructions further comprise instructions, which when executed by the processor, cause the processor to present the content elements in a linear scrollable arrangement and sequentially within the second area of the display of the mobile computing device so as to indicate to a user the presence of others of the content elements in the linear scrollable arrangement.

19. The mobile computing device of claim 14, wherein the computer readable instructions further comprise instructions, which when executed by the processor, cause the processor to coordinate presentations within the first, second and a third area of the display of the mobile computing device, the third area comprising a series of soft keys, each of the soft keys corresponding to a respective one of the interactive elements highlighting designated areas of the image.

* * * * *